United States Patent [19]

Ensley

[11] Patent Number: 4,872,754

[45] Date of Patent: Oct. 10, 1989

[54] CONSTANT FREQUENCY DIGITAL CLOSED-LOOP OPTICAL FIBER GYRO

[76] Inventor: Donald L. Ensley, 303 Tom Jones Ct., Bodega Bay, Calif. 94923

[21] Appl. No.: 105,880

[22] Filed: Oct. 7, 1987

[51] Int. Cl.$^4$ ............................................. G01C 19/64
[52] U.S. Cl. .................................................... 356/350
[58] Field of Search .......................................... 356/350

[56] References Cited

U.S. PATENT DOCUMENTS 4,529,312  7/1985  Pavlath .
4,545,682 10/1985  Greenwood .................. 356/350

FOREIGN PATENT DOCUMENTS 8300552  2/1983  PCT Int'l Appl. .

OTHER PUBLICATIONS

Ezekiel, Fiber-Optic Rotation Sensors, Tutorial Review, pp. 2–35.
Giallorenzi et al., Optical-fiber sensors challenge the competition, IEEE Spectrum, Sep., 1966, pp. 44–49.
Giallorenzi, Fibre optic sensors, Optics and Technology, Apr., 1971, pp. 73–78.
Bergh, et al. All-single mode fiber-optic gyroscope, Optical Society of America, Mar., 1981, 4 pages.
Cahill et al., Phase-nulling fiber-optic gyro, Optical Society of America, Mar., 1979, pp. 93–95.
Okamoto et al., All-Panda-Fibre Gyroscope With Long-Term Stability, Electronic Letters, May, 1984, pp. 429–430.
Arditty, et al., Sagnac effect in fiber gyroscopes, Optical Society of America, Aug. 1981, pp. 401–403.
Bohm, Low-Drift Fibre Gyro Using a Superluminescent Diode, Apr., 1981, 2 pages.
Lefevre et al., All-fiber gyroscope with inertial-navigation short-term sensivity, Optical Society of America, Sep., 1982, pp. 454–456.
McMahon et al. Fiber-optic transducers, IEEE Spectrum, Dec., 1981, pp. 24–29.

Primary Examiner—Vincent P. McGraw
Assistant Examiner—S. A. Turner
Attorney, Agent, or Firm—Stephen G. Rudisill

[57] ABSTRACT

An improved fiber-optic inertial sensor of the Sagnac interferometer type is provided with the capability of precise linear measurement of sensed motion. The sensor uses closed-loop synchronous demodulation of sensed signals representative of angular motion in a manner that permits operation over a wide dynamic range in inertial rate along with null stability and a high degree of noise rejection. The improved inertial sensor comprises a multi-turn sensing coil of optical fiber; an optical pulse source supplying optical pulses to both ends of the sensing coil so that the pulses are propagated in opposite directions through the coil; a phase modulator for introducing a non-reciprocal phase difference between the counter-propagating optical pulses, the relative phase difference between the pulses remaining fixed when the coil is stationary but changing when the coil is moved; and a circuit responsive to changes in the relative phase difference for (1) producing an output signal reresenting the magnitude and direction of the change and (2) adjusting the phase of the optical pulses supplied to the sensing coil to at least partially null out any change in the relative phase difference.

16 Claims, 3 Drawing Sheets

CONSTANT FREQUENCY DIGITAL CLOSED-LOOP OPTICAL FIBER GYRO

BACKGROUND OF THE INVENTION

1. Field of the Invention

The present invention relates generally to fiber-optic inertial sensors such as linear and angular accelerometers, and particularly Sagnac ring interferometers and closed-loop angular motion sensors utilizing such interferometers.

2. Description Of Related Art

A traditional Sagnac ring interferometer is a single-fiber interferometric sensor which divides a light beam and propagates it in opposite directions around a multi-turn coil of single-mode optical fiber. Then when the coil is rotated, the two counter-propagating beams undergo equal and opposite phase shifts. The two-phase shifted beams are then re-combined to convert the phase differences to an intensity-modulated light signal whose intensity is proportional to the rate of rotation, i.e., the angular velocity, of the coil.

SUMMARY OF THE INVENTION

It is a primary object of the present invention to provide an improved fiber-optic inertial sensor which produces an output signal which has a precisely linear relationship to the motion being sensed.

It is another important object of this invention to provide such an improved fiber-optic inertial sensor which has a wide dynamic range, e.g., which is capable of accurately measuring both extremely small and extremely large angular or linear velocities.

A specific object of one particular embodiment of this invention is to provide an improved inertial sensor which has a high degree of noise rejection.

Other objects and advantages of the invention will be apparent from the following detailed description and the accompanying drawings.

In accordance with the present invention, the foregoing objectives are realized by providing a fiber-optic inertial sensor comprising a sensing coil of optical fiber; means for supplying optical pulses to both ends of the sensing coil so that the optical pulses are propagated in opposite directions through the fiber of the coil; means for introducing a relative phase difference between the counter-propagating optical pulses, the relative phase difference remaining fixed when the coil is stationary but changing when the coil is moved, and means responsive to changes in the relative phase difference for (1) producing an output signal representing the magnitude and direction of the change, and (2) adjusting the phase of the optical pulses supplied to the coil to at least partially null out any change in the relative phase difference.

DESCRIPTION OF THE PREFERRED EMBODIMENTS

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents and alternatives falling within the spirit and scope of the invention as defined by the appended claims.

Figure 1:
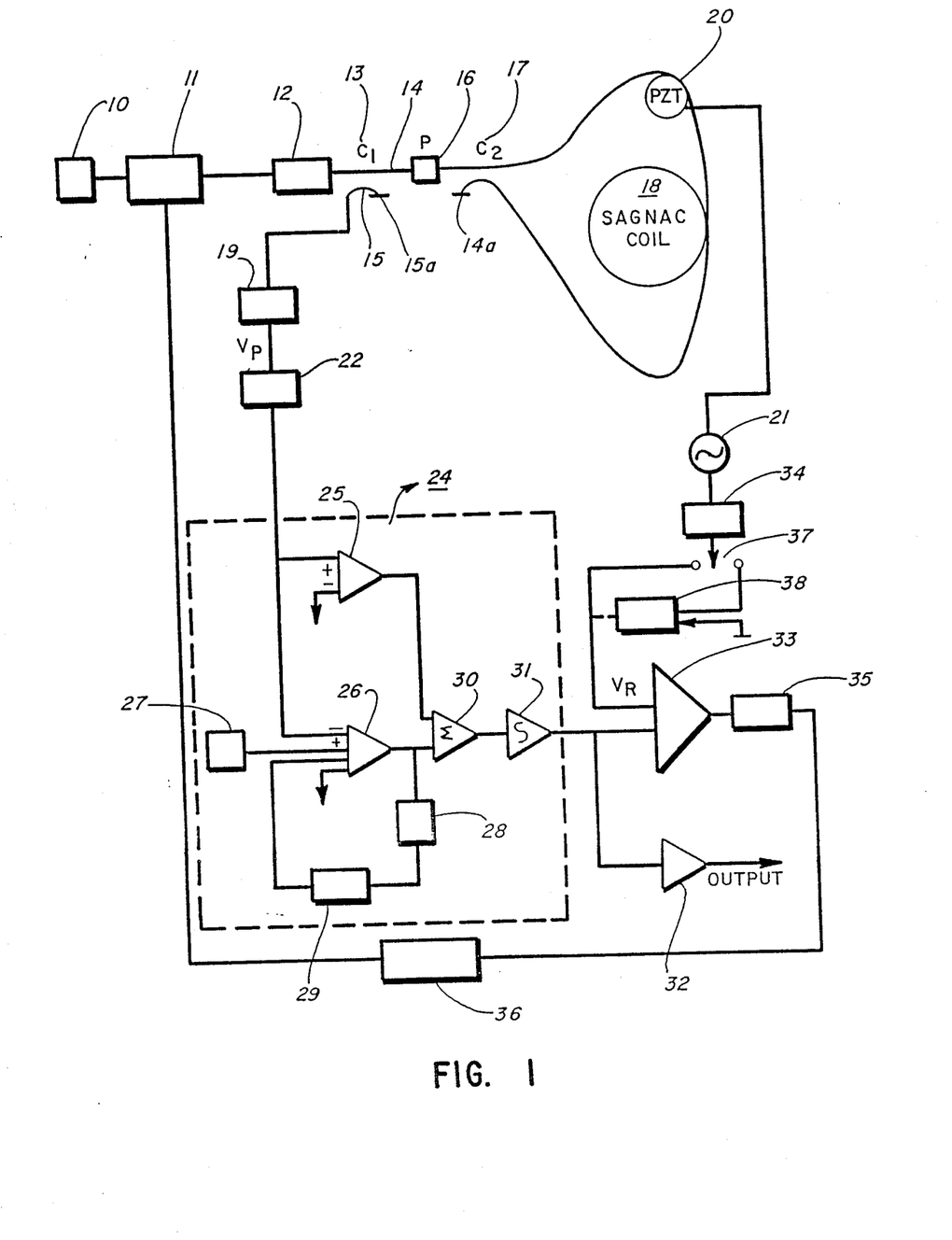
FIG. 1 is a functional diagram of a closed-loop angular motion sensor embodying the present invention.

Turning now to the drawings and referring first to FIG. 1, a light source 10, preferably a super-radiant diode (SRD), produces an optical signal in the form of a partially coherent light beam which is operated directly as a pulsed source or passed through an optical modulator 11 and an optical delay line 12 to a directional coupler 13. The SRD is a laser diode chip operated in a Q-spoiled manner to produce a Gaussian-shaped power spectrum with a half-power spread in wavelength of approximately 15 nanometers and corresponding coherence length of about 100 microns. As an alternative, a conventional laser diode may be employed as a source of optical energy, with the diode being pulse excited to produce a reduction in coherence and a resultant power spectral density similar to that from a SRD. The modulator 11 and the delay line 12 will be described in more detail below. The coupler 13 functions as a beam splitter to divide the optical signal equally between two optical fibers 14 and 15. The fiber 15 leads to a photodetector and a non-reflecting termination 15a, while the fiber 14 leads to a polarizer 16.

Both the optical fibers 14 and 15 are preferably single-mode fibers such as the fiber described in Dyott U.S. Pat. No. 4,669,814 issued June 2, 1987. The fiber described in that patent, which is known as the "D-fiber", is not only a single-mode fiber but also polarization-maintaining. Even though the fibers 14 and 15, as well as the directional couplers 13 and 17, are polarization-maintaining, it is desirable to include the polarizer 16 in the optical circuit to remove any light that is not aligned with the desired polarization plane.

From the polarizer 16, the optical signal is passed through a second directional coupler 17 which again functions as a beam splitter to divide the optical signal equally between two ends of a multi-turn coil 18 formed from the fiber 14. The fiber 14 is then terminated at a non-reflecting termination 14a. The two counter-propagating optical signals in the coil 18 will be referred to as the clockwise or "CW" signal and the counterclockwise or "CCW" signal. After traversing the coil 18, these signals emerge from opposite ends of the coil 18 and again pass through the directional coupler 17, this time in the reverse direction. From the coupler 17, the CW and CCW signals pass on through the polarizer 16 and the coupler 13. The coupler 13 directs half of this optical energy into the fiber 15 which leads to a conventional photodetector 19.

The counter-propagating CW and CCW signals in the sensing coil 18 are used to sense any angular motion of the coil 18 by the well known Sagnac effect. As mentioned previously, angular movement of the coil 18 shifts the phase of the two counter-propagating signals in opposite directions. This relative phase shift between the two signals is known as the "Sagnac" phase shift and is defined by the equation:

$$\phi_s = \frac{8\pi NA\omega}{\lambda c}$$

where A is the area bounded by the optical-fiber coil, N is the number of turns of optical fiber around the area A, $\omega$ is the angular velocity of the coil around an axis perpendicular to the plane of the coil, $\lambda$ is the free space wavelength of the optical signal supplied to the coil, and c is the free space velocity of light. All these parameters are constant except for the variable omega, and thus the phase shift can be used to determine the angular velocity omega.

To facilitate measurement of the phase shift $\phi_S$, a non-reciprocal phase shift is introduced into the CW and CCW signals by means of a phase modulator 20 at one end of the sensing coil 18. This phase modulator produces a relative phase shift between the CW and CCW signals even in the absence of angular motion of the coil 18. This non-rotationally induced, non-reciprocal phase shift biases the operating point of the system to the point where the sensitivity to angular motion of the sensing coil is a maximum. That is, the change in the detector photocurrent for a given change in the angular velocity is maximized by introducing a fixed, non-reciprocal bias of $\pi/2$, so that the system operates at the point of maximum slope. Furthermore, the direction of the change in the detector photocurrent indicates the direction of the change in the angular velocity of the coil. The amplitude of the phase modulation is, therefore, preferably $\pm\pi/2$, and the modulation frequency $f_o$ should be high enough to cause the detector noise to be dominated by photon shot noise.

A number of different phase modulators may be used for this purpose, but it is preferred to use a PZT modulator which utilizes a piezoelectric disc having several turns of the optical fiber 14 wound around the outer surface of the disc. A pair of electrodes are attached to opposite sides of the disc at the center of the disc, and these electrodes are connected to an electronic oscillator 21. The mechanical oscillations induced in the piezoelectric disc by the output of the electronic oscillator 21 cause periodic stretching of the fiber wound around the disc. Optic pulses which pass through the fiber around the disc while that fiber is stretched undergo a phase shift relative to optical pulses which pass through that same portion of the fiber while it is relaxed. Thus, by selecting the parameters of the system such that only the CW pulses, or only the CCW pulses, pass through the phase modulator 20 while the fiber is stretched, a relative phase difference is produced between the two counter-propagating signals.

The oscillator 21 may be a simple single-transistor Colpitts-type oscillator whose frequency is controlled by the piezoelectric crystal of the phase modulator 20. Alternatively, a cesium beam frequency standard may be utilized. The cesium beam atomic reference is accurate to one part in $10^{12}$, which provides the precision required for applications such as space-based systems and submarine navigation. Such atomic references are commonly used in satellite communication systems, and are usually configured as a divide-down to 5-MHz control loop using a quartz crystal as a slave oscillator. These circuits are used on ships and aircraft to obtain MTBF values of several years, and can be used to produce an inertial grade fiber-optic sensor.

A cesium-beam frequency standard circuit typically consists of four major elements: a crystal-controlled slave oscillator, a frequency multiplier, a cesium beam microwave resonator (cesium beam tube) and a servo circuit (frequency control loop). One preferred embodiment for precise (inertial grade) frequency control for the optical phase modulator utilizes a standard 5-MHz quartz crystal output (e.g., FTS Inc. Mod. 4100 frequency and time standard module), frequency divided to a series resonant PZT (or electro-optical) optical phase modulator at approximately 10 KHz, and divided down or multiplied up to appropriate optical source modulation, integrator reset, sample and synchronous demodulator reference signals used in the circuits described herein. The usual quartz slave oscillator may be replaced with the PZT optical phase modulator oscillator serving the role of the slave oscillator in the cesium beam circuit, at the appropriate series resonant frequency of the PZT disc. The only change required in this embodiment is the addition of a voltage-activated frequency control to the PZT oscillator transistor circuit appropriate to the control voltage range operated by the cesium beam servo loop. Extremely fine frequency control can be achieved in such circuits using the Zeeman field control for the cesium resonant frequency, as well as long term stability of one part in $10^{12}$.

In order to provide a Sagnac coil optical transit time phase of $(2n+1)\pi$ radians at the phase modulator 20, the period $T_o = 2\pi f_o$ is preferably related to the transit time $\alpha$ by $T_o = 2\alpha/n$, where n is a whole integer. For precise inertial navigation applications, it is desirable to provide a frequency stability of a few parts per million over the required environmental conditions for linearity control, as well as automatic gain control to maintain the oscillator reference voltage at a fixed amplitude.

A precise coil transit time phase can be maintained over a given temperature range by modeling the Sagnac thermal expansion and PZT temperature frequency response (if required) by utilizing a simple thermistor bridge generating a temperature dependent voltage, and then using a model stored in memory (e.g., ROM) to make a small correction in the comparator trigger voltage and the clock frequency. A preferred embodiment is an analog system in which the PZT oscillator frequency/temperature response is designed via the passive components (i.e., the resistors and capacitors) to compensate for the thermal expansion coefficient in the Sagnac coil to the required degree of accuracy in scale factor and linearity. An example is an AGC performance of 10 microvolts at a 10-volt peak-to-peak reference level.

Returning now to FIG. 1, the photodetector 19 is preferably a combined photodiode and operational amplifier with peak spectral response in the 850 nanometer range. Suitable commercially available components of this type are the Motorola MFOD2404 and the EG&G HAD1100. These units have responsivities in the range of 0.5 amps/watt, offset currents of less than 5pA, offset voltage drifts of less than 3 microvolts/°C., and slew rates in excess of 100 volts/microsecond. If desired, a silicon photodiode may be used with a wide bandwidth preamplifier to achieve a wider slew rate/bandwidth combination.

The output of the photodetector 19 is a series of pulses whose amplitude is proportional to the relative phase difference between the CW and CCW signals from the sensing coil 18. Within the detector, the received optical pulses produce a photocurrent consisting of a train of pulses at the clock frequency and having a pulse width of approximately 100 nanoseconds. This photocurrent is converted to a voltage signal, referred to as the "pickoff signal", by passing the photocurrent through a thermally stable, thin metal film-type resistor The pickoff signal is passed through a scaling/AGC circuit 22 so that the signal may be scaled to a controlled amplitude. The scaling/AGC circuit 22 is typically a combination of a scaling amplifier and an AGC circuit.

The scaled output of the circuit 22 is applied to a phase-sensitive-rotation-detection (PSRD) circuit 24 for generating a signal representative of the angular velocity of the sensing coil 18. The PSRD 24 includes a pair of operational amplifiers 25 and 26, and the series of pulses from the filter 22 is applied to the non-inverting input of the first operational amplifier 25, and to the inverting input of the second operational amplifier 26. The amplifier 26 also receives, at its non-inverting input, a fixed voltage from a reference signal source 27. The result of these inputs to the two operational amplifiers 25 and 26 is a pair of pulse train outputs which are precisely 180° out of phase with each other. The pulse train from tee amplifier 26 has a constant amplitude fixed by the reference signal from the source 27; this constant amplitude is maintained by an automatic gain control (AGC) feedback loop including a peak detector 28 and a sample and hold circuit 29. The amplitude of the pulse train from the amplifier 25 varies in proportion to variations in the amplitude of the output pulses from the photodetector 19, which is the amplitude that is proportional to the relative phase difference between the CW and CCW signals.

The pulse trains from the two operational amplifiers 25 and 26 are combined in a summing amplifier 30. In the absence of any angular movement of the sensing coil 18, the two pulse trains precisely cancel each other to produce a "zero" output from the summing amplifier 30. When the coil undergoes angular motion about an axis perpendicular to the plane of the coil, however, the amplitude of the pulses in the output of the photodetector 19 changes accordingly, resulting in a corresponding change in the amplitude of the pulse train from the operational amplifier 25. Meanwhile, the amplitude of the pulse train from the operational amplifier 26 remains fixed at the level established by the reference voltage. Consequently, there is a difference between the amplitudes of the two pulse trains supplied to the summing amplifier 29, and thus the output of the summing amplifier is a series of pulses whose amplitude is proportional to the difference between the amplitudes of the two trains of input pulses. That difference, in turn, is proportional to the magnitude of the phase shift between the CW and CCW signals due to the angular movement of the sensing coil. That is, the magnitude of the pulses in the output of the summing amplifier 30 is a measure of the angular velocity of the sensing coil 18.

To convert the output of the summing amplifier 30 to a DC voltage level, the output is passed through an integrator 31. This integrator 31 is preferably a high gain, low noise, operational amplifier having a capacitive feedback loop. The output voltage of the integrator 31 is a variable level voltage whose magnitude is proportional to the angular velocity of the sensing coil. A positive output voltage from the integrator 31 indicates clockwise angular movement of the sensing coil 18, while a negative voltage indicates counterclockwise angular movement of the sensing coil. An integrator time constant of several microseconds and a forward loop gain of several thousand can be employed with stable operation.

The output voltage from the integrator 31 may be applied to any appropriate interface. For example, this output voltage can be used for analog-type direct scaling through an appropriate line driver such as an operational amplifier 32; the scaling is then measured in volts per unit velocity Alternatively the output voltage can be modulated and output as volts RMS per unit velocity. If it is desired to produce a signal representing angular displacement, as opposed to velocity, the output voltage of the integrator 31 may be supplied to an analog integrator.

One of the significant advantages of the illustrative closed-loop circuit is the ability to convert the output voltage of the integrator into a digital signal. This can be accomplished by using an analog-to-digital converter or by simply supplying the voltage to a VCO (voltage-controlled oscillator) to produce an output frequency proportional to the angular velocity of the sensing coil. This output frequency can then be digitized using known techniques, such as a comparator and NAND gate. The number of pulses per unit time (pulse repetition rate) in the resulting digital output signal then represents the angular velocity of the sensing coil, while the total number of pulses represents the angular displacement (i.e., a second integration is accomplished digitally).

In order to generate a feedback control signal for the optical source modulator 11, the outputs of the integrator 31 and the oscillator 21 are supplied to a precision comparator 33 (e.g., an LMI19 comparator with voltage rails at ±15 volts DC). The oscillator output is passed through a 60dB bandpass filter 34 to control the total harmonic distortion in the reference sine wave generated by the oscillator, to be compatible with that in the optical phase modulator. As in the case of the bandpass filter 22 described above, the center of the passband of the filter 34 is set at the fundamental resonant frequency of the phase modulator crystal, and the pass band has a width of about 3 KHz. The output of the integrator 31 is used as the trigger-level input to the precision comparator 33. One example of a suitable integrator is an OPA37 operational amplifier with a feedback capacitor of 1000 pf between pins 6 and 2, a 10-k ohm resistor from pin 3 to ground, and voltage rails at ±15 volts DC.

Because the total optical harmonic distortion exhibited by the resonant phase modulator 20 is typically less than −60dB, the filter 34 should provide a similar total harmonic distortion for the reference voltage waveform supplied to the comparator 33. Since the purpose of this filter is to produce a pure sine wave by selective discrimination of harmonics, a low pass filter extending up to approximately 10% above the fundamental frequency $f_o$ is a suitable alternative to the bandpass filter. One example of such a low pass filter is a Salent-key type double pole low pass filter using an OPA37 operational amplifier.

The output of the comparator 33 is supplied to a pair of NAND gates 35 which produce a train of output pulses having a period $T_o$ corresponding to the oscillator frequency $f_o$, and a phase determined by the magnitude of the output signal from the integrator 31. For example, a dual NAND gate such as a SN54LS02J may have its input pins series-inverted connected to produce a narrow pulse width of 100 nanoseconds once every reference period, with a phase determined by the trigger level. The phase of the pulse train will vary from 0 to $\pi/2$ with respect to the reference wave as the trigger voltage varies from zero to the level of the reference signal.

The output pulses from the comparator 33 are passed through a driver circuit 36 to the optical source modulator 11, thereby controlling the modulation of the optical signal from the laser 10. Whenever the sensing coil 18 has an angular velocity, resulting in a change in the relative phase difference between the counter-propagating CW and CCW signals in the coil, the control signal supplied to the modulator 11 from the driver 36 shifts the phase of the pulse train supplied to the sensing coil 18 so that the relative phase difference between the CW and CCW signals in the coil is restored to its original value, corresponding to zero angular velocity of the coil. The most important characteristics of the driver circuit are a power handling capability to modulate up to 500 milliamps, and a reasonable rise time of less than 5 nanoseconds.

The modulator 11 is preferably a laser diode such as the GaAlAs laser diode Model SDL-2100-EI made by Spectra Diode Labs of San Jose, California. This particular diode has a 10-watt peak pulse power and can be driven with the Model SDL-800 laser diode driver made by the same company. Alternatively, a superradiant diode (SRD), such as the GO-3000 series made by General Optronics Corp., may be used as the modulator 11.

To calibrate the closed-loop circuit for linearity, a known phase shift is introduced into the reference signal from the filter 34 by positioning a switch 37 to channel the reference signal through a phase-shifting circuit 38. This circuit 38 can be manually adjusted, while the sensing coil 18 is moved at a precisely known angular velocity, for minimum linearity deviation. The phase shift required to achieve the minimum linearity deviation is then inserted into the closed-loop system via the optical delay line 12. Alternatively, the phase shift may be inserted into the circuit electronically.

The preferred optical delay line 12 is simply a length of the same type of optical fiber used in the couplers 13 and 17 and the coil 18. The length of the fiber determines the phase shift inserted into the optical circuit.

Figure 2:
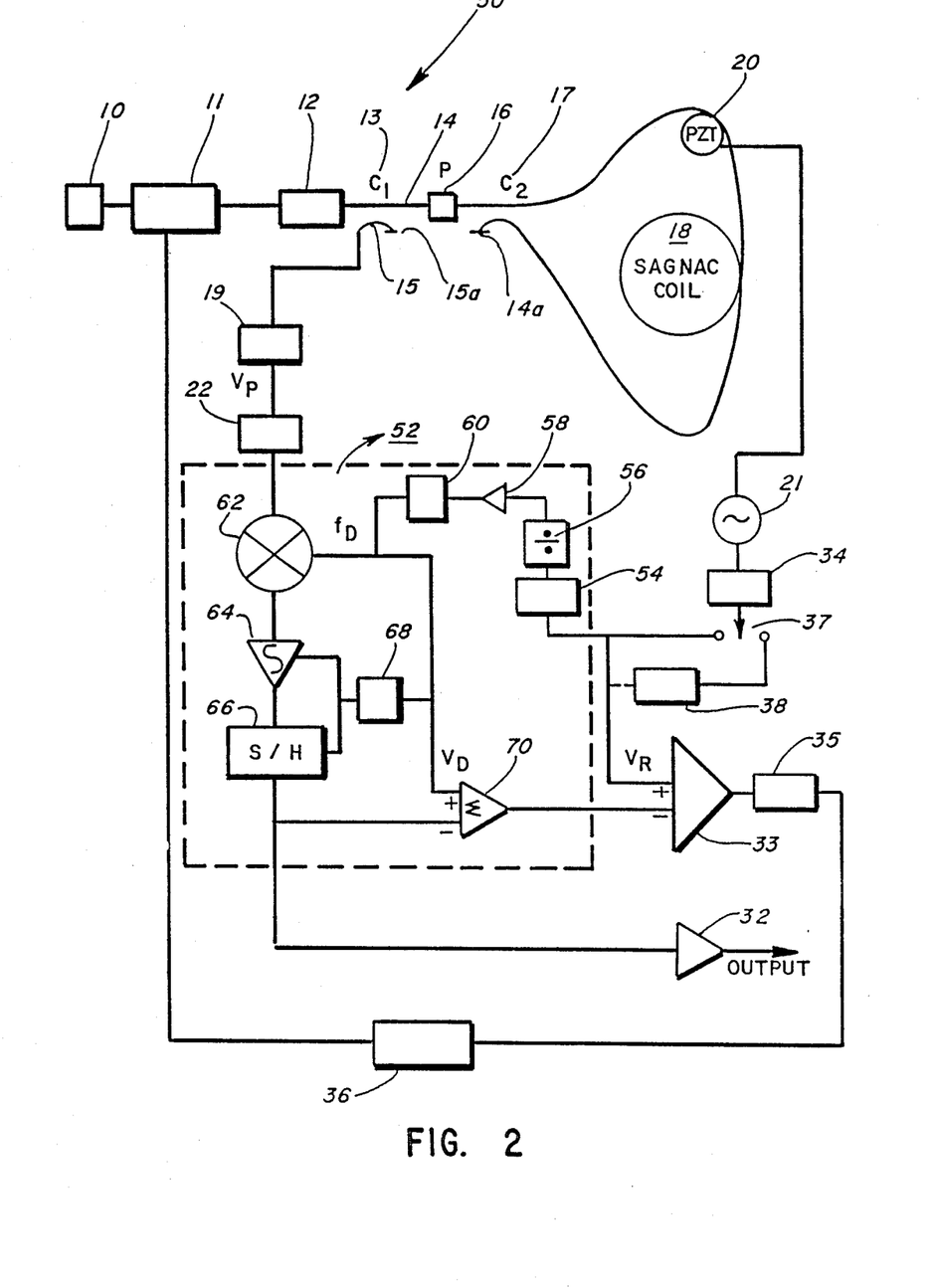
FIG. 2 is a diagram of a modified closed-loop angular motion sensor embodying the present invention.

Referring now to FIG. 2, there is shown a functional diagram of an alternative embodiment of a closed-loop angular motion sensor embodying the present invention. The basic operation as well as the circuit configuration of this alternative embodiment are identical to the embodiment of FIG. 1 except for the technique and circuit utilized to process the output signal of the photodetector 19 to achieve signals representing the angular velocity of the sensing coil 18 and for controlling the optical source modulator 11. More specifically, the angular motion sensor 50 illustrated at FIG. 2 utilizes a phase-sensitive-rotation-detection (PSRD) circuit 52 which is different from that of the PSRD 24 of the rotation sensor illustrated at FIG. 1. The remaining components of the sensor and their operation are unchanged and for the sake of convenience and clarity these components have been accorded reference numerals identical to those used for the corresponding components in FIG. 1.

In the rotation sensor 50, the PSRD circuit 52 utilizes a superimposed dither phase modulation to detect any shift in the phase difference between the CW and CCW signals as a result of any change in the angular velocity of the sensing coil 18. As in the case of the embodiment of FIG. 1, closed-loop control is obtained by varying the phase of the detected pulse-train relative to a reference voltage to vary the time of arrival of the CW and CCW optical pulses at the location of the phase modulator 20. This variation in the arrival times of the CW and CCW pulses provides a variable optical phase shift between the CW and CCW pulses and can be used to null out the Sagnac phase shift produced by inertial rotation to achieve phase-null closed-loop operation.

In the PSRD circuit 52, a dither phase modulation at a dither frequency $f_d$ is introduced into the output of the photodetector 19 to superimpose the dither on the phase modulation already provided by the phase modulator 20 at the system clock frequency $f_o$. The desired output pulse-train is subsequently extracted by synchronous detection based upon ascertaining the presence or absence of the dither frequency component. More specifically, the filtered output of the reference oscillator 21, (i.e., the signal constituting the reference voltage $V_R$ supplied to the comparator) is used to generate a dither frequency $f_d$ by first passing that output through a set of dual NAND gates 54 to generate an appropriate pulse train. This pulse train is then passed through a digital divider circuit 56 to produce a digital pulse train having a repetition rate equal to the selected dither frequency $f_d$. The pulse train is scaled through an appropriate amplifier 58 and passed through an AGC circuit 60 to generate the dither signal with controlled amplitude.

The amplifier 58 is used to scale the dither pulse train to a voltage level $V_d$ representing a phase shift at the PZT phase modulator 20 equal to an integral multiple of $\pi/2$ radians. Accordingly, when the dither pulse train is superimposed upon the scaled detector output at a mixer 62, the resulting phase dither modulation occurs about the null point of the Sagnac coil. Consequently, as long as the sensing coil 18 is stationary, the photodetector output level remains unchanged even after being combined with the dither pulse train at the mixer 62. Since the phase dither modulation occurs about null, there is no change in the photodetector output level with the frequency $f_d$ because the photodetector intensity is the even periodic function proportional to Cos $(2\phi_S+V_df_d)$. Thus, the phase dither is switching back and forth between identical phase points, and the pick-off pulses are constant in amplitude and repetition rate as long as the non-reciprocal phase shift caused by inertial rotation rate is zero or an appropriate null set value.

However, if any other phase shift occurs, due to angular motion of the sensing coil 18, the output from the photodetector contains the frequency $f_d$ with a phase dependent on the sense of rotation rate. This frequency and its phase is subsequently detected by a synchronous demodulation process to produce an output voltage representative of the change in non-reciprocal phase shift between the counter-propagating signals. The output voltage is consequently indicative of the angular velocity of the sensing coil. The synchronously demodulated output voltage is also used to null out any change in the non-reciprocal phase shift introduced into the Sagnac coil, by using the voltage as a feedback signal to adjust the modulation of the light source.

The synchronous demodulation process begins with the multiplier 62 which combines the detected pulse train, after being passed through an operational amplifier 63 for scaling and AGC, with the phase dither pulse train. The resulting multiplied signal is integrated over a fixed number of dither periods using a high gain integrator 64. The integrated output is then fed to a sample/hold circuit 66 to produce an output which is maintained at a positive or negative level depending upon the phase of the dither modulation at $f_d$. A bilateral switch 68, which is timed by the same digital counter used to produce the dither voltage $V_d$ from the reference oscillator 21, is used to provide reset or trigger signals for controllably activating both the integrator 64 and the sample/hold circuit 66. The timing pulses provided to the bilateral switch 68 are controlled in such a way that the charge-holding means in the integrator 64 is shorted with every reset pulse, and integration is subsequently restarted at the zero level. At the same time, the timing pulses cause the bilateral switch 68 to reset the sample/hold circuit 66 so that the sampling and holding process is initiated and continues until the end of the predetermined integration period. In other words, the output of the multiplier 62 is integrated over the selected number of dither periods, and the resulting output is sampled and held over the same period. The switching action of bilateral switch 68 is conveniently provided by NAND gates through which timing or trigger pulses are concurrently applied to the integrator 64 and the sample/hold circuit 66.

Closed-loop operation of the synchronous detection or demodulation process is provided by feeding the output of the sample/hold circuit 66 to one of the summing nodes of a dual-input summing amplifier 70. The second node of the amplifier 70 is fed directly by the scaled dither voltage $V_d$ from the scaling amplifier 58 and the AGC circuit 60. The resulting summed voltage is fed as the trigger level to the precision comparator 33 in conjunction with the phase-adjusted reference voltage $V_R$ to generate the synchronized pulse train which is fed back to the optical source modulator 11 through the NAND gates 35 and the modulation driver circuit 36 (as described in detail above with reference to FIG. 1).

Since the phase dither voltage is summed with the detected and integrated pulse train at amplifier 70, the pulse train generated by the comparator 33 comprises the original pulses sensed by the photodetector 19 which are now phase modulated at the dither frequency rate $f_d$. As the synchronized pulse train is fed to the optical source modulator 11 it effectively transposes the phase dither onto the optical pulses arriving at the PZT phase modulator 20. Accordingly, any Sagnac phase shift caused by angular motion of the sensing coil is nulled out by the closed-loop nature of synchronous demodulation since the comparator trigger level is continuously adjusted within the loop in such a way as to reduce to zero any detected signal pulsating at the dither frequency $f_d$.

The closed loop signal generated by the sample/hold circuit 66 is also extracted as the output signal of the rotation sensor after suitable filtering and amplification and is representative of the angular velocity of the sensing coil 18.

In summary, the PSRD circuit 52 of FIG. 2 functions by using a phase dither signal at a selected frequency $f_d$ to detect a voltage representative of a non-recriprocal phase shift introduced into the Sagnac coil of the sensor as a result of rotation of the sensing coil 18. The same voltage is also used in combination with the dither signal to generate an error voltage which varies the optical phase shift of the sensor system to null out the non-reciprocal phase shift. Closed-loop operation is obtained by detecting any phase shift in photodetector output at the dither frequency and integrating the resulting signal so that it is directly proportional to the rate of angular motion of the coil. In effect, synchronous demodulation of the detected output is performed within a closed loop by nulling an alternating current signal at the dither frequency. The requirements for optimum operation of such an A.C. modulation scheme employing non-reciprocal phase dither are that the amplitude of the phase dither modulation should be plus or minus $(2n+1)\pi/2$, $n=0, 1, 2 \ldots$, in order to obtain maximum gain, and the rate of modulation should be sufficiently high for the photodetector noise to be dominated by photon shot noise. Also, to ensure that the extracted output signal accurately represents a linear function of the angular velocity of the coil, it is essential that identical phase relationship be maintained between the pulse train generated by the optical source modulator and the Sagnac phase modulator.

Figure 3:
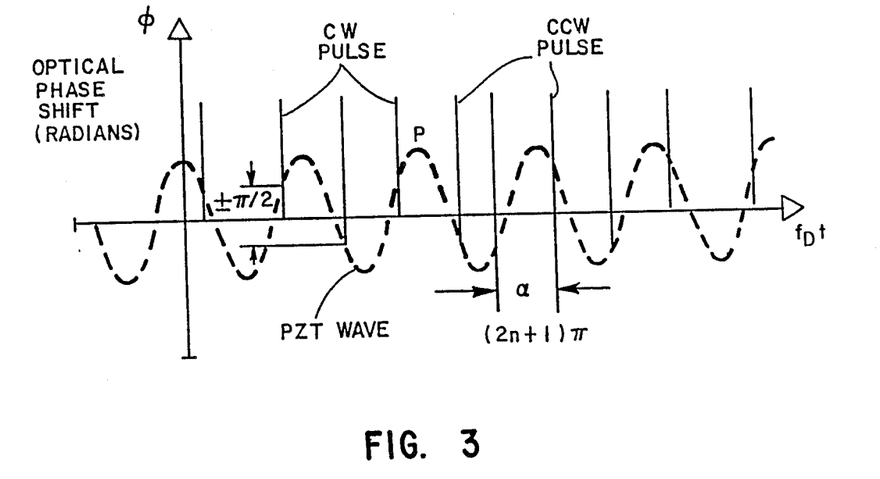
FIG. 3 is a graphical diagram illustrating the phase relationship between the phase modulator waveform and the CW and CCW pulses arriving at the modulator.

In order to achieve a wide dynamic range of inertial rate measurement, it is important that a substantially large optical phase excursion be provided by the phase modulator used in the sensor. More specifically, the PZT phase modulator 20 is operated with a fixed maximum optical phase excursion so that the total available control phase shift that can be generated between the CW and CCW signals (even in the absence of angular motion of the sensing coil) is large. This aspect of the invention is understood from FIG. 3 which is a graphical illustration of the relation between the PZT optical phase modulator waveform and the CW and CCW pulses arriving at the modulator. It is apparent from the waveforms shown therein that the maximum phase difference that can be obtained between the counter-propagating pulses, and hence the maximum phase shift that can be counterbalanced, is limited to the excursion between peaks and valleys of the PZT modulator waveform (the dashed waveform). Accordingly, the higher end of the dynamic range of measurement is established by the peak amplitude P of the phase excursion at the PZT modulator. The lower end of the dynamic range is fixed by the maximum optical or electronic noise level at which photodetection and measurement of phase difference is possible. The amplitude of phase excursion at the PZT modulator is hence set at a large multiple of $\pi$ radians, typically about $300\pi$, so that the total available control phase shift and hence the dynamic range is extended.

While the rotational sensor according to this invention has been described with reference to two particular embodiments, numerous modifications to these may be implemented without departing from the scope of the invention. For example, it is not necessary that the optical pulse repetition rate be equal to the clock oscillator period. Instead, the clock frequency could be digitally divided down to some lower frequency and a tank circuit and filter arrangement used to produce a lower frequency sinewave to be applied as the reference voltage $V_R$ to the comparator. Such an arrangement would produce a phase-locked pulse train for use in modulating the light source as previously described. However, in this case the photodetector current would represent pulses at the lower pulse repetition rate, and the subsequent synchronous demodulation would take place with reference to the selected lower frequency rather than the clock frequency. This type of stepped frequency operation might be desirable in precise inertial guidance applications where the optical transit time for the coil may be many clock periods in length.

As is apparent from the foregoing, the present invention provides an improved fiber-optic inertial sensor which allows precisely linear measurement of sensed motion and displays null stability as well as a high degree of noise rejection. The inertial sensor uses closed-loop synchronous demodulation of sensed signals representative of angular motion and permits operation over a wide dynamic range in inertial angular rate so that both extremely small and extremely large angular velocities may be measured with accuracy.

I claim:

1. A fiber-optic inertial sensor comprising a sensing coil of optical fiber,
   a source of optical energy, operating at a known frequency, for supplying an optical signal to said sensing coil,
   means for digitally modulating the intensity of said optical energy source so that said optical signal comprises a series of optical pulses, each at said known source frequency, for which the optical energy is alternately turned on and off for a finite time period at a known sample rate,
   a directional coupler connected between said source and both ends of said coil for dividing each pulse of said optical signal between the two ends of said coil so that each pulse of said optical signal is split into two components and propagated in opposite directions through the fiber of the coil,
   an optical phase modulator operating at a known modulation frequency and connected to said sensing coil for producing a relative phase difference between the two counter-propagating components of the pulses of said optical signal, and time synchronized with the pulses of said optical signal,
   means for digitally sampling the optical phase modulator waveform at a sample rate determined by the optical phase modulator modulation frequency, said relative phase difference remaining independent of said optical modulation frequency, with the magnitude of said relative phase difference varying only in response to a change in movement of said coil,
   means for detecting any change said relative phase difference between said counter-propagating components of the pulses of said optical signal to produce an output signal representing said coil movement, and
   means responsive to said detected change in said relative phase difference for adjusting the time phase of said series of optical pulses from said source, relative to that of said optical phase modulator, in order to change said relative phase difference between said counter-propagating components, thereby reducing said change in relative phase caused by coil movement without altering said known frequency of said optical energy source.

2. The fiber-optic inertial sensor of claim 1 wherein said detecting and adjusting means include
   a photodetector coupled to both ends of said coil for receiving said two optical signals and producing a corresponding electrical control signal which varies in accordance with changes in said relative phase difference,
   oscillator means coupled to said phase modulator for producing an electrical reference signal having the same period as said two optical signals, and
   control means responsive to said electrical control signal and said electrical reference signal for adjusting the phase of said optical signal from said light source to reduce any change in said relative phase difference between said two counter-propagating optical signals.

3. The fiber-optic inertial sensor of claim 2 wherein said photodetector produces an electrical control signal having an amplitude which is proportional to said relative phase difference between said two counter-propagating optical signals.

4. The fiber-optic inertial sensor of claim 3 wherein said detecting and adjusting means include a reference signal source and means for converting said electrical control signal to a rate-of-change-of-inertial-motion signal proportional to the difference between the amplitudes of said reference signal and said electrical control signal.

5. The fiber-optic inertial sensor of claim 4 which includes a comparator receiving the output of said oscillator and said rate-of-change-of-inertial-motion signal and producing a series of control pulses having the same period as the output of said oscillator and a phase proportional to said change-of-inertial-motion signal.

6. The fiber-optic inertial sensor of claim 5 wherein said modulating means includes means responsive to said control pulses for adjusting the phase of said output pulses from said light source to reduce any change in said relative phase difference between said two counter-propagating optical signals.

7. The fiber-optic inertial sensor of claim 4 wherein said electrical control signal is a pulse train,
   said reference signal source comprises means for producing a second pulse train having the same period and pulse width as the pulse train comprising said control signal, the pulses in said second pulse train having a fixed amplitude, and
   said means for converting said electrical control signal to a rate-of-change-of-inertial-motion signal comprises means for summing the two pulse trains.

8. The fiber-optic inertial sensor of claim 1 wherein said means for adjusting the modulation of said light source nullifies said detected change in said relative phase difference.

9. The fiber-optic inertial sensor of claim 1 wherein said sensing coil is subject to angular movement, and said relative phase difference varies in response to said angular movement.

10. A fiber-optic inertial sensor comprising a sensing coil of optical fiber,
    a source of optical energy, operating at a known frequency, for supplying optical pulses to both ends of said coil so that said optical pulses are propagated in opposite directions through the fiber of said coil at a known pulse rate,
    an optical phase modulator operating at a known modulation frequency and connected to said sensing coil for introducing a relative phase difference between said counter-propagating optical pulses, and time synchronized with said optical pulses from said source, said relative phase difference remaining fixed when said coil is stationary but changing when said coil is moved,
    means for digitally sampling the optical phase modulator waveform at a sample rate determined by the optical phase modulator modulation frequency, said relative phase difference remaining independent of said optical modulation frequency, with the magnitude of said relative phase difference varying only in response to a change in movement of said coil, means for detecting any change in said relative phase difference between said counter-propagating optical pulses to produce an output signal representing said coil movement, and means responsive to detected changes in said relative phase difference for (1) producing an output signal representing the magnitude and direction of said change, and (2) adjusting the time phase of the optical pulses supplied to said coil, relative to that of said optical phase modulator, to at least partially null out any change in said relative phase difference, thereby reducing said change in relative phase caused by coil movement without altering said known frequency of said optical energy source.

11. The fiber-optic inertial sensor of claim 10 wherein said adjustments in the phase of the optical pulses supplied to said coil are linearly proportional to said changes in said relative phase difference due to movement of said coil.

12. The fiber-optic inertial sensor of claim 10 which includes a common system clock for controlling both (1) the introduction of said relative phase difference between said counter-propagating optical pulses, and (2) said adjustments in the phase of the optical pulses supplied to said coil.

13. The fiber-optic inertial sensor of claim 10 which includes a modulated light source for producing said optical pulses supplied to said coil, a phase modulator in said coil for introducing said relative phase difference between said counter-propagating optical pulses, and a common oscillator for controlling the modulation rate of both said modulated light source and said phase modulator.

14. The fiber-optic inertial sensor of claim 13 further including means for modulating the counter-propagating optical pulses which have been modulated by said phase modulator, at a selected dither frequency, in such a way that the modulated pulses contain components at said dither frequency if said relative phase difference between said counter-propagating optical pulses changes and wherein said means for sensing changes in relative phase difference between said pulses includes means responsive to the presence of said dither frequency components in said modulated pulses to produce said output signal representing the magnitude and direction of said phase difference.

15. The fiber-optic inertial sensor of claim 13 which includes control means responsive to the output of said oscillator for producing a pulse train for controlling the modulation of said light source, said pulse train having the same period as the output of said oscillator, said control means also being responsive to said relative phase difference between said counter-propagating optical pulses for shifting the phase of said pulse train to reduce changes in said relative phase difference.

16. The fiber-optic inertial sensor of claim 3 further including means for modulating the counter-propagating optical pulses which have been relatively phase shifted by said phase modulator, at a selected dither frequency, in such a way that the modulated pulses contain components at said dither frequency if said relative phase difference between said counter-propagating optical pulses changes and wherein said detecting and adjusting means includes means responsive to the presence of said dither output signal representing the magnitude and direction of said phase difference.

* * * * *